United States Patent
Salter et al.

(10) Patent No.: US 10,190,742 B1
(45) Date of Patent: Jan. 29, 2019

(54) ILLUMINATING VEHICLE WINDOW ASSEMBLIES FOR PROVIDING AUXILIARY BRAKE LIGHTS

(71) Applicant: Ford Global Technologies, LLC, Dearborn, MI (US)

(72) Inventors: Stuart C. Salter, White Lake, MI (US); Paul Kenneth Dellock, Northville, MI (US); Chad Hoover, Washington, MI (US); Christopher Charles Hunt, Livonia, MI (US); Doug H. Randlett, Metamora, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/658,694

(22) Filed: Jul. 25, 2017

(51) Int. Cl.
| | |
|---|---|
| *F21S 43/20* | (2018.01) |
| *B60Q 1/26* | (2006.01) |
| *B60Q 1/44* | (2006.01) |
| *B60Q 1/46* | (2006.01) |
| *F21S 43/33* | (2018.01) |
| *F21S 43/14* | (2018.01) |
| *F21Y 115/10* | (2016.01) |

(52) U.S. Cl.
CPC ............. *F21S 43/26* (2018.01); *B60Q 1/268* (2013.01); *B60Q 1/44* (2013.01); *B60Q 1/46* (2013.01); *F21S 43/14* (2018.01); *F21S 43/33* (2018.01); *F21Y 2115/10* (2016.08)

(58) Field of Classification Search
CPC .. B60Q 1/44; B60Q 1/46; B60Q 1/268; F21S 43/26
USPC .......................................................... 362/509
See application file for complete search history.

(56) References Cited

U.S. PATENT DOCUMENTS

| | | | |
|---|---|---|---|
| 5,952,917 A * | 9/1999 | Zimmermann | B60Q 1/0023 307/10.8 |
| 6,351,211 B1 | 2/2002 | Bussard | |
| 6,509,832 B1 * | 1/2003 | Bauer | B60Q 1/0023 340/425.5 |
| 7,859,391 B1 | 12/2010 | Solis | |
| 2007/0183066 A1 * | 8/2007 | Varaprasad | B32B 17/06 359/844 |
| 2008/0238648 A1 * | 10/2008 | Tewari | B60Q 1/444 340/469 |
| 2011/0057786 A1 | 3/2011 | Giddens | |
| 2014/0225727 A1 * | 8/2014 | Niazi | B60Q 1/0035 340/471 |
| 2015/0375673 A1 | 12/2015 | Testai et al. | |

FOREIGN PATENT DOCUMENTS

| | | |
|---|---|---|
| DE | 102010023988 | 2/2011 |
| FR | 2738783 | 10/1997 |

* cited by examiner

Primary Examiner — Toan Ly
(74) Attorney, Agent, or Firm — Carlson, Gaskey & Olds

(57) ABSTRACT

An illuminating vehicle window assembly includes a glass panel, a metallic layer secured to the glass panel, and a light source for illuminating the glass panel to produce an auxiliary brake light within the glass panel. Another exemplary illuminating vehicle window assembly includes a glass panel including a frit area, an optics device formed on the frit area, and a light source for illuminating the glass panel to produce an auxiliary brake light within the glass panel.

18 Claims, 3 Drawing Sheets

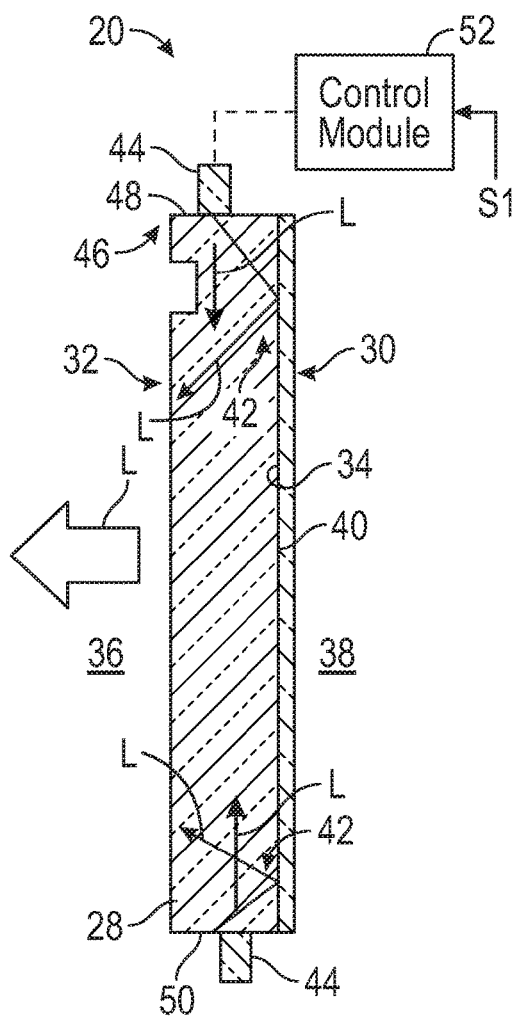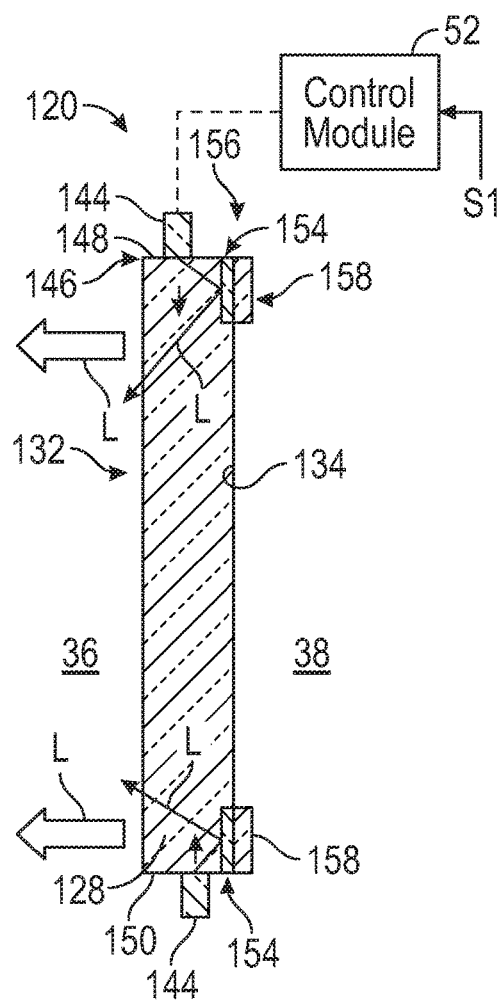

ILLUMINATING VEHICLE WINDOW ASSEMBLIES FOR PROVIDING AUXILIARY BRAKE LIGHTS

TECHNICAL FIELD

This disclosure relates to an illuminating vehicle window assembly. An exemplary illuminating vehicle window assembly includes a glass panel that can be selectively illuminated to indicate the vehicle is braking.

BACKGROUND

Vehicle lighting systems include a multitude of lighting and signaling devices for illuminating the vehicle and alerting others of the vehicle's presence and driving intentions. These lighting systems are typically required to including brake lights for indicating that the vehicle is braking, and thus, attempting to stop. Known brake lights do not always clearly indicate the severity of the braking event. Accordingly, auxiliary brake light systems may be desirable in this field of technology.

SUMMARY

An illuminating vehicle window assembly according to an exemplary aspect of the present disclosure includes, among other things, a glass panel, a metallic layer secured to the glass panel, and a light source for illuminating the glass panel to produce an auxiliary brake light within the glass panel.

In a further non-limiting embodiment of the foregoing illuminating vehicle window assembly, a control module is configured to control the light source for illuminating the glass panel.

In a further non-limiting embodiment of either of the foregoing illuminating vehicle window assemblies, the metallic layer is secured to an interior surface of the glass panel.

In a further non-limiting embodiment of any of the foregoing illuminating vehicle window assemblies, the metallic layer is a partially vacuum metalized film or a direct partial metallization layer.

In a further non-limiting embodiment of any of the foregoing illuminating vehicle window assemblies, the metallic layer is configured to reflect light from the light source toward an exterior surface of the glass panel.

In a further non-limiting embodiment of any of the foregoing illuminating vehicle window assemblies, the light source is positioned at a top edge of the glass panel.

In a further non-limiting embodiment of any of the foregoing illuminating vehicle window assemblies, a second light source is positioned at a bottom edge of the glass panel.

In a further non-limiting embodiment of any of the foregoing illuminating vehicle window assemblies, the light source is a light emitting diode (LED).

In a further non-limiting embodiment of any of the foregoing illuminating vehicle window assemblies, the LED is a red LED for producing the auxiliary brake light.

In a further non-limiting embodiment of any of the foregoing illuminating vehicle window assemblies, the LED is a dual red/amber LED for producing the auxiliary brake light and a flashing hazard light.

An illuminating vehicle window assembly according to another exemplary aspect of the present disclosure includes, among other things, a glass panel including a frit area, an optics device formed on the frit area, and a light source for illuminating the glass panel to produce an auxiliary brake light within the glass panel.

In a further non-limiting embodiment of the foregoing illuminating vehicle window assembly, a backing is applied over the optics device.

In a further non-limiting embodiment of either of the foregoing illuminating vehicle window assemblies, the backing includes red paint applied over the optics device at the frit area.

In a further non-limiting embodiment of any of the foregoing illuminating vehicle window assemblies, the backing extends about an outer perimeter of the glass panel.

In a further non-limiting embodiment of any of the foregoing illuminating vehicle window assemblies, the optics device is configured to reflect light from the light source toward an exterior surface of the glass panel.

In a further non-limiting embodiment of any of the foregoing illuminating vehicle window assemblies, the light source is a red light emitting diode (LED) for producing the auxiliary brake light.

In a further non-limiting embodiment of any of the foregoing illuminating vehicle window assemblies, the light source is a dual red/amber LED for producing the auxiliary brake light and a flashing hazard light.

In a further non-limiting embodiment of any of the foregoing illuminating vehicle window assemblies, the light source is a Red, Green, Blue (RGB) light emitting diode for producing the auxiliary brake light and an interior/exterior light.

In a further non-limiting embodiment of any of the foregoing illuminating vehicle window assemblies, a control module is configured to control the light source for illuminating the glass panel.

A method according to another exemplary aspect of the present disclosure includes, among other things, automatically illuminating a glass panel of an illuminating vehicle window assembly to provide an auxiliary brake light in response to a maximum vehicle braking event.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 is a cross-sectional view of the illuminating window assembly of FIG. 2.

FIG. 4 is a cross-sectional view of another exemplary illuminating window assembly.

DETAILED DESCRIPTION

This disclosure details illuminating vehicle window assemblies for selectively producing auxiliary brake lights.

An exemplary illuminating vehicle window assembly includes a glass panel, a metallic layer secured to the glass panel, and a light source for illuminating the glass panel. Another exemplary illuminating vehicle window assembly includes a glass panel, an optics device integrated into a portion of the glass panel, and a light source for illuminating the glass panel. The glass panel of the illuminating vehicle window assembly can be selectively illuminated to provide an auxiliary brake light in response to a vehicle braking event. These and other features of this disclosure are described in greater detail below.

Figure 1:
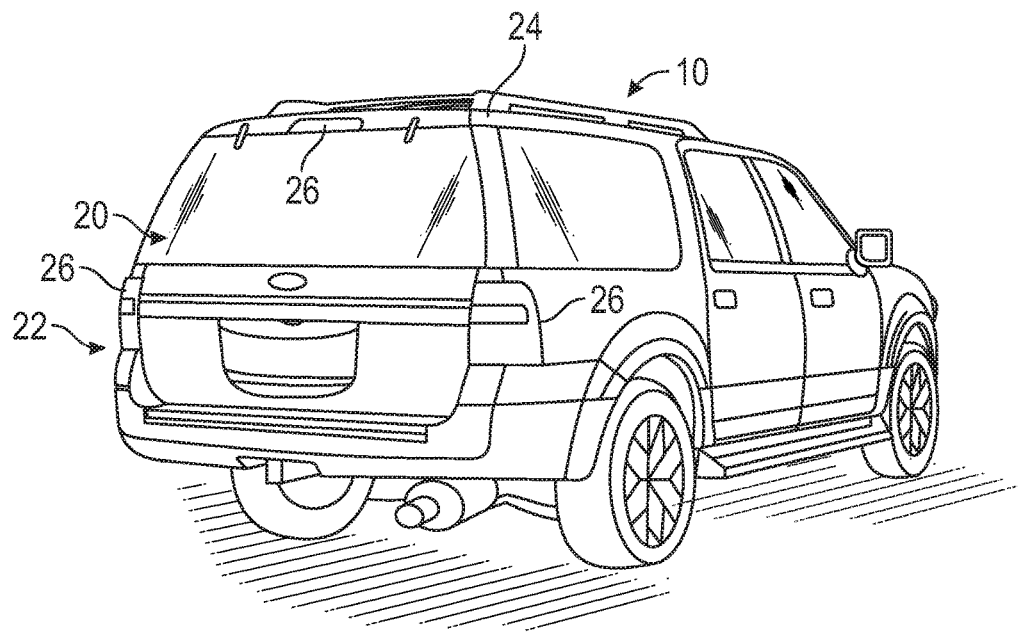
FIG. 1 illustrates a vehicle equipped with an illuminating window assembly.

FIG. 1 schematically illustrates a vehicle 10. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 may be equipped with an illuminating window assembly 20. The illuminating window assembly 20 is generally positioned at an exterior rear portion 22 of the vehicle 10. In the illustrated embodiment, the illuminating window assembly 10 is configured as a rear window assembly of the vehicle 10. Although an illuminating window assembly for the rear portion 22 of the vehicle 10 is described herein, illuminating window assemblies positioned at other vehicle locations could be similarly configured. In another embodiment, the vehicle 10 could be equipped with multiple illuminating window assemblies 20 (e.g., at the front, rear, and/or sides of the vehicle 10).

The illuminating window assembly 20 may be mounted to a portion of a vehicle body 24. In an embodiment, the illuminating window assembly 20 is mounted to a rear end assembly of the vehicle body 24. Other mounting locations are also contemplated within the scope of this disclosure.

The illuminating window assembly 20 may be part of a lighting and signaling system of the vehicle 10. In an embodiment, the illuminating window assembly 20 is selectively controlled to provide an auxiliary brake light. As will be discussed in greater detail below, the auxiliary brake light operates in conjunction with one or more primary brake lights 26 during certain vehicle braking events to indicate to nearby drivers that the vehicle 10 is braking, and therefore, preparing to stop.

Figure 2:
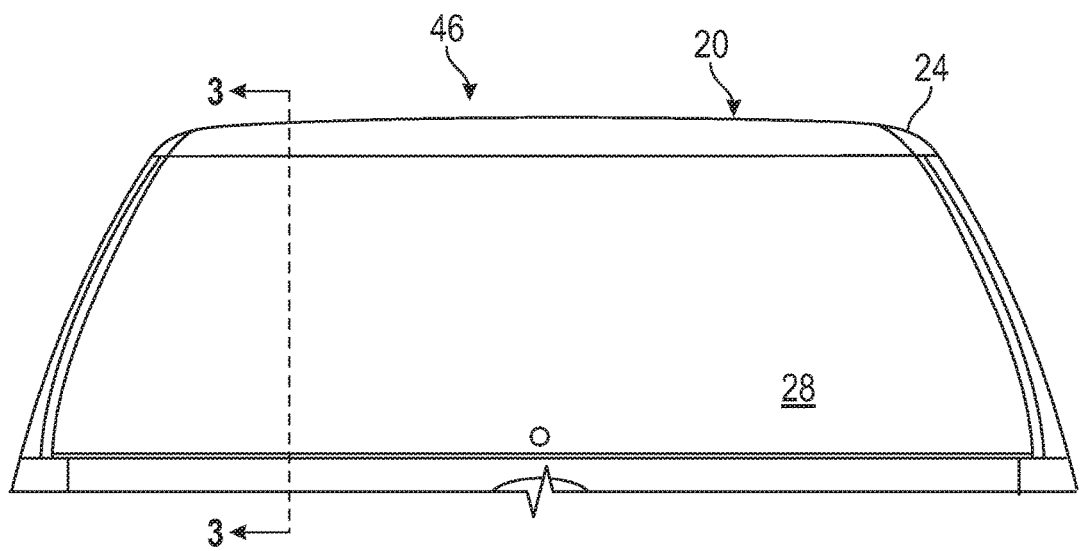
FIG. 2 illustrates an exemplary illuminating window assembly.

FIGS. 2 and 3, with continued reference to FIG. 1, illustrate additional details of the illuminating window assembly 20. In an embodiment, the illuminating window assembly 20 includes a glass panel 28, a metallic layer 30, and one or more light sources 44.

The glass panel 28 may be made of any conventional glass material or combinations of materials and could embody any size and shape. The size, shape, and material make-up of the glass panel 28 are not intended to limit this disclosure.

The glass panel 28 includes an exterior surface 32 and an interior surface 34. The exterior surface 32 faces toward an exterior 36 of the vehicle 10, and the interior surface 34 faces toward a passenger cabin 38. Among many other functions, the glass panel 28 allows light to enter the passenger cabin 38 while reducing glare and reducing ultraviolet rays, shields vehicle occupants from wind and debris, provides an aerodynamic surface for air to flow around the vehicle 10, etc.

The metallic layer 30 may be secured to the interior surface 34 of the glass panel 28. In an embodiment, the metallic layer 30 is an aluminum film; however, other metallic films could also be utilized. In another embodiment, the metallic layer 30 is a partial vacuum metalized film that is applied on the interior surface 34 using an adhesive 40. The adhesive 40 may be a pressure sensitive adhesive or any other type of adhesive. In yet another embodiment, the metallic layer 30 is a direct partial metallization layer.

The metallic layer 30 may act similar to tinting in that it reduces the amount of light L that enters into the passenger cabin 38. However, instead of just absorbing the light L, the metallic layer 30 reflects the light L back toward the exterior surface 32 (as shown schematically at 42) and then out of the glass panel 28. The light L that is ultimately emitted through the exterior surface 32 of the glass panel 28 may be configured to provide an auxiliary brake light.

The light sources 44 may be positioned along an outer perimeter 46 of the glass panel 28. In an embodiment, one or more light sources 44 are positioned at each of a top edge 48 and a bottom edge 50 of the outer perimeter 46 for illuminating the glass panel 28. However, it should be understood that the light sources 44 could be located at other positions relative to the glass panel 28. When illuminated, the glass panel 28 acts as a light pipe that can still be seen through. Therefore, the visibility of the driver of the vehicle 10 is not impaired even when the glass panel 28 is being illuminated to produce the auxiliary brake light.

Each light source 44 may be a light emitting diode (LED). Other light sources could also be utilized within the scope of this disclosure. In an embodiment, the light sources 44 are red LEDs for producing the auxiliary brake light within the glass panel 28. In another embodiment, the light sources 44 are dual red/amber LEDs for selectively producing both the auxiliary brake light within the glass panel 28 and a flashing hazard light within the glass panel 28. In yet another embodiment, the light sources 44 are Red, Green, Blue (RGB) LEDs for selectively producing both the auxiliary brake light within the glass panel 28 and an interior/exterior light within the glass panel 28 when the vehicle 10 is in park.

The light sources 44 may be powered by a vehicle power supply system, for example. The total number of light sources 44 provided within the illuminating window assembly 20 may vary and is vehicle dependent. In an embodiment, the illuminating window assembly 20 includes a sufficient number of light sources 44 for visualizing the auxiliary brake light emitted therefrom during both daytime conditions and nighttime conditions. The intensity of the light emitted by the light sources 44 can be varied to provide the auxiliary brake light at the proper intensity during both daytime conditions and nighttime conditions.

Each light source 44 of the illuminating window assembly 20 can be controlled to emit light, such as to produce the auxiliary brake light, in response to a command from an illumination control module 52. The control module 52 may be equipped with executable instructions for interfacing with and commanding operation of various components of the illuminating window assembly 20, including the light sources 44. The control module 52 may include a processing unit and non-transitory memory for executing the various control strategies and modes of the illuminating window assembly 20. The processing unit, in an embodiment, is configured to execute one or more programs stored in the memory of the control module 52. A first exemplary program, when executed, may determine when and how to illuminate (or, optionally, not to illuminate) the glass panel 28 of the illuminating window assembly 20. The control module 52 could also control various other functions associated with the illuminating window assembly 20 of the vehicle 10.

In another embodiment, the control module 52 may communicate with other control systems for deciding whether or not to illuminate the glass panel 28. For example, the control module 52 may receive control signals S1 from a powertrain control module and/or a braking control module to determine whether to produce the auxiliary brake light within the illuminating window assembly 20.

FIG. 4 illustrates another exemplary illuminating window assembly 120 for producing an auxiliary brake light on the vehicle 10. In this embodiment, the illuminating window assembly 120 includes a glass panel 128, one or more optics devices 154, and one or more light sources 144.

The glass panel 128 includes an exterior surface 132 that faces an exterior 36 of the vehicle 10 and an interior surface 134 that faces a passenger cabin 38 of the vehicle 10. The glass panel 128 may also include a frit area 156 that extends about an outer perimeter 146 of the glass panel 128.

The optics devices 154 are integrated into a portion of the glass panel 128. For example, the optics devices 154 may be formed within the frit area 156 of the glass panel 128. In an embodiment, the optics devices 154 include texturing that is laser etched into the frit area 156 of the glass panel 128. Other techniques may also be utilized to integrate the optics devices 154 within the glass panel 128.

A backing 158 may be applied over the optics devices 154 at the frit area 156 of the glass panel. In an embodiment, the backing 158 is a red colored paint that is applied over the fit area 156. The backing 158 gives the frit area 156 the look of a brake light when the glass panel 128 is illuminated by the light sources 144.

The optic device(s) 154 reflect the light L emitted by the light source(s) 144, such as in a narrow pattern that can be emitted with a desired directionality through the exterior surface 132 of the glass panel 128. The light L that is ultimately emitted through the exterior surface 132 of the glass panel 128 may be configured to provide an auxiliary brake light.

The light sources 144 may be positioned along the outer perimeter 146 of the glass panel 128. In an embodiment, one or more light sources 144 are positioned at each of a top edge 148 and a bottom edge 150 of the outer perimeter 146 for illuminating the glass panel 128. However, it should be understood that the light sources 144 could be located at other positions relative to the glass panel 128.

Each light source 144 may be a light emitting diode (LED). In an embodiment, the light sources 144 are red LEDs for producing the auxiliary brake light within the glass panel 128. In another embodiment, the light sources 144 are dual red/amber LEDs for selectively producing both the auxiliary brake light within the glass panel 128 and a flashing hazard light within the glass panel 128. In yet another embodiment, the light sources 144 are Red, Green, Blue (RGB) LEDs for selectively producing both the auxiliary brake light within the glass panel 128 and an interior/exterior light within the glass panel 128 when the vehicle 10 is in park.

Each light source 144 of the illuminating window assembly 120 can be controlled to emit light, such as to produce the auxiliary brake light, in response to a command from an illumination control module 52. The control module 52 may be equipped with executable instructions for interfacing with and commanding operation of various components of the illuminating window assembly 120, including the light sources 144. The control module 52 may include a processing unit and non-transitory memory for executing the various control strategies and modes of the illuminating window assembly 20. The processing unit, in an embodiment, is configured to execute one or more programs stored in the memory of the control module 52. A first exemplary program, when executed, may determine when and how to illuminate (or, optionally, not to illuminate) the glass panel 128 of the illuminating window assembly 120.

In another embodiment, the control module 52 may communicate with other control systems for deciding whether or not to illuminate the glass panel 128. For example, the control module 52 may receive control signals S1 from a powertrain control module and/or a braking control module to determine whether to produce the auxiliary brake light within the illuminating window assembly 120.

Figure 5:
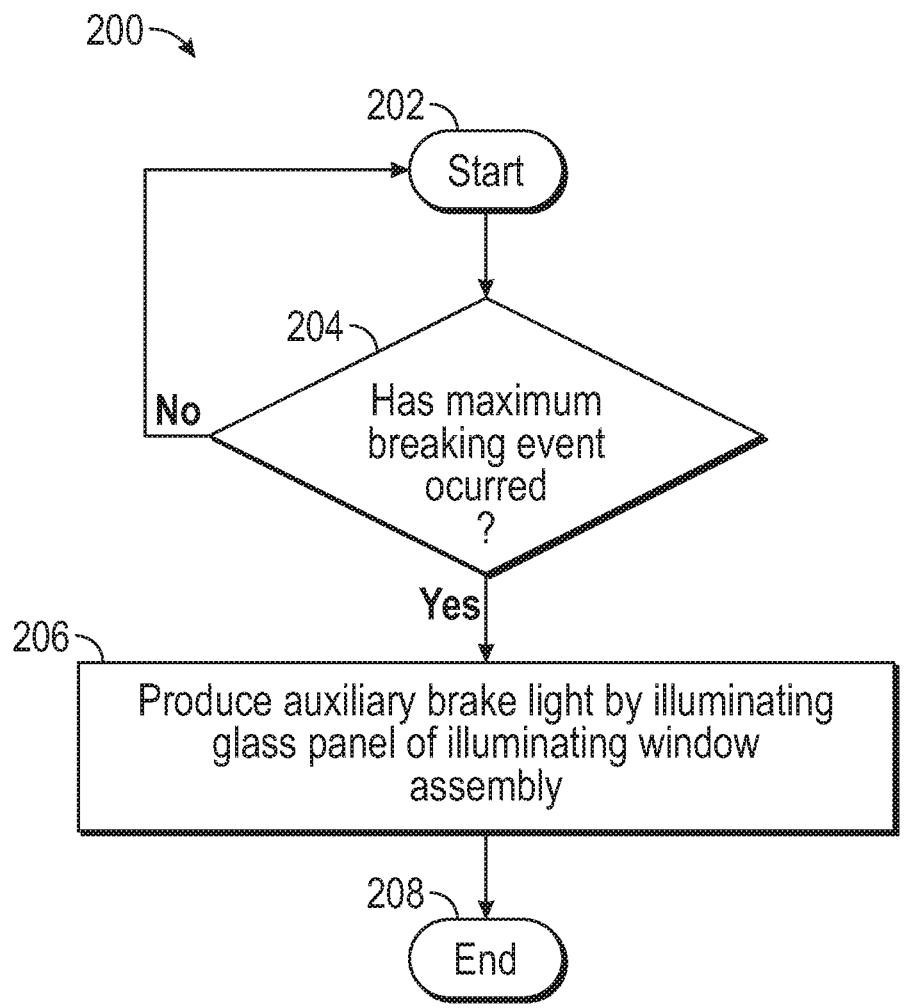
FIG. 5 schematically illustrates a control strategy for controlling an illuminating vehicle window assembly to provide an auxiliary brake light.

FIG. 5, with continued reference to FIGS. 1-4, schematically illustrates a control strategy 200 for controlling the illuminating window assembly 20, 120 to provide an auxiliary brake light during a vehicle braking event of the vehicle 10. In a non-limiting embodiment, the control module 52 of the illuminating window assembly 20, 120 is programmed with one or more algorithms adapted to execute the exemplary control strategy 200.

The exemplary control strategy 200 begins at block 202. At block 204, the control strategy 100 determines if a maximum braking event has occurred. In this disclosure, a maximum braking event occurs when the vehicle driver has applied the maximum amount of force that can be applied to a brake pedal of the vehicle 10 without locking the tires of the vehicle 10. The control signal S1 is communicated to the control module 52 each time a maximum braking event has occurred.

The control strategy 200 proceeds to block 206 if a maximum braking event has occurred. At block 206, the auxiliary brake light is produced by illuminating the glass panel 28, 128 of the illuminating window assembly 20, 120. The auxiliary brake light provides a visible indication of the braking intentions of the vehicle 10. The control strategy 200 may end at block 208.

The illuminating window assemblies described herein are capable of communicating a variety of lighting effects to persons outside of the vehicle (e.g., pedestrians, bicyclists, operators of other vehicles, etc.). In a particular embodiment, the illuminating window assemblies produce an auxiliary brake light that is relatively large and hence more visible compared to primary brake lights alone. The auxiliary brake lights described herein may therefore more clearly indicate the severity of a given braking event.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An illuminating vehicle window assembly, comprising:
a glass panel;
a metallic layer secured to the glass panel; and
a light source for illuminating the glass panel to produce an auxiliary brake light within the glass panel,
wherein the metallic layer is configured to reflect light from the light source toward an exterior surface of the glass panel.

2. The illuminating vehicle window assembly as recited in claim 1, comprising a control module configured to control the light source for illuminating the glass panel.

3. The illuminating vehicle window assembly as recited in claim 1, wherein the metallic layer is secured to an interior surface of the glass panel.

4. The illuminating vehicle window assembly as recited in claim 1, wherein the metallic layer is a partially vacuum metalized film or a direct partial metallization layer.

5. The illuminating vehicle window assembly as recited in claim 1, wherein the light source is positioned at a top edge of the glass panel.

6. The illuminating vehicle window assembly as recited in claim 5, comprising a second light source positioned at a bottom edge of the glass panel.

7. The illuminating vehicle window assembly as recited in claim 1, wherein the light source is a light emitting diode (LED).

8. The illuminating vehicle window assembly as recited in claim 7, wherein the LED is a red LED for producing the auxiliary brake light.

9. The illuminating vehicle window assembly as recited in claim 7, wherein the LED is a dual red/amber LED for producing the auxiliary brake light and a flashing hazard light.

10. An illuminating vehicle window assembly, comprising:
a glass panel including a frit area;
an optics device formed on the frit area; and
a light source for illuminating the glass panel to produce an auxiliary brake light within the glass panel,
wherein the optics device is configured to reflect light from the light source toward an exterior surface of the glass panel.

11. The illuminating vehicle window assembly as recited in claim 10, comprising a backing applied over the optics device.

12. The illuminating vehicle window assembly as recited in claim 10, wherein the light source is a red light emitting diode (LED) for producing the auxiliary brake light.

13. The illuminating vehicle window assembly as recited in claim 10, wherein the light source is a dual red/amber LED for producing the auxiliary brake light and a flashing hazard light.

14. The illuminating vehicle window assembly as recited in claim 10, wherein the light source is a Red, Green, Blue (RGB) light emitting diode for producing the auxiliary brake light and an interior/exterior light.

15. The illuminating vehicle window assembly as recited in claim 10, comprising a control module configured to control the light source for illuminating the glass panel.

16. An illuminating vehicle window assembly, comprising;
a glass panel including a frit area;
an optics device formed on the frit area;
a light source for illuminating the glass panel to produce an auxiliary brake light within the glass panel; and
a backing applied over the optics device,
wherein the backing includes red paint applied over the optics device at the frit area.

17. The illuminating vehicle window assembly as recited in claim 16, wherein the backing extends about an outer perimeter of the glass panel.

18. A method, comprising:
automatically illuminating a glass panel of an illuminating vehicle window assembly to provide an auxiliary brake light in response to a maximum vehicle braking event,
wherein the illuminating vehicle window assembly includes a metallic layer or an optics device that is configured to reflect light from a light source toward an exterior surface of the glass panel.

* * * * *